March 19, 1968

J. W. COPELAND 3,373,932

TIME, SPEED AND DISTANCE COMPUTER

Filed Oct. 20, 1965

INVENTOR.
JOHN W. COPELAND

BY *John H. Widdowson*

ATTORNEY

March 19, 1968     J. W. COPELAND     3,373,932
TIME, SPEED AND DISTANCE COMPUTER
Filed Oct. 20, 1965     2 Sheets-Sheet 2
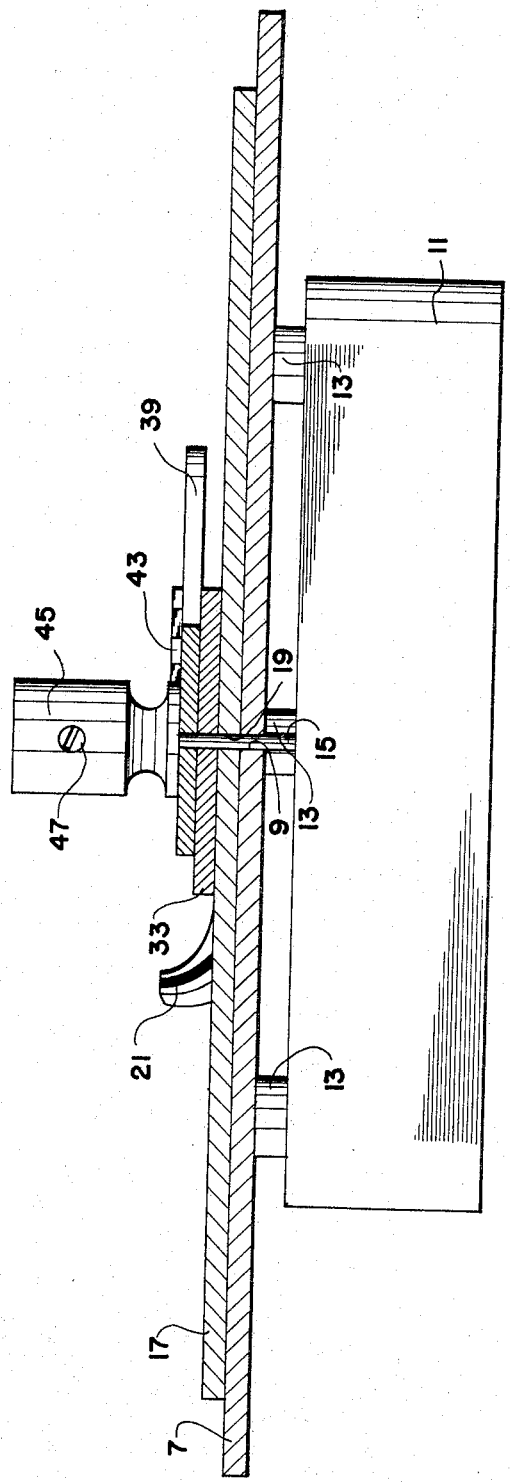
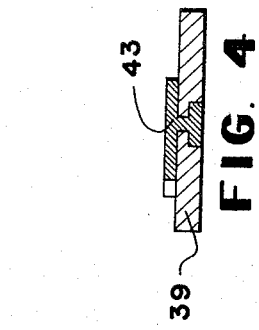
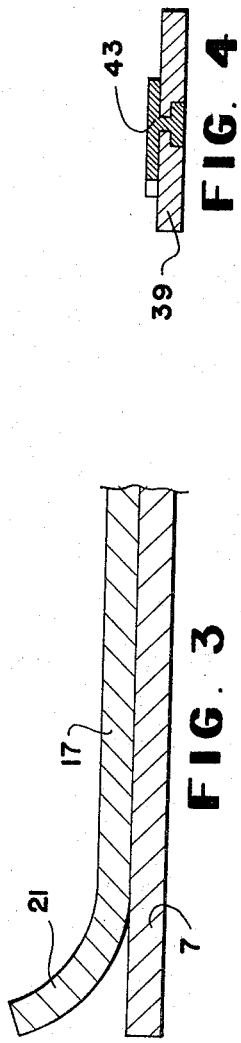
INVENTOR.
JOHN W. COPELAND
BY *John H. Widdmson*
ATTORNEY

United States Patent Office 3,373,932
Patented Mar. 19, 1968

3,373,932
TIME, SPEED AND DISTANCE COMPUTER
John W. Copeland, 161 S. Oliver, Wichita, Kans. 67218
Continuation-in-part of application Ser. No. 436,129,
Mar. 1, 1965. This application Oct. 20, 1965, Ser.
No. 498,977
4 Claims. (Cl. 235—61)

ABSTRACT OF THE DISCLOSURE

This invention relates to computing devices, more particularly to computing devices for correlating time, speed and distance variables. Still more specifically this invention relates to computing devices which utilize linear scales that are easy to read and to interpolate, and which has a clock mechanism in conjunction therewith, which devices are simple to manipulate in operation. Additionally, this invention relates to a computing device easily usable by airline pilots to set forth current time past the hour, miles travelled from a given checkpoint, the estimated time of arrival, total flying time required, and time elapsed since passing last checkpoint.

---

This invention is a continuation-in-part of my copending application entitled, "Time, Speed and Distance Computer," Ser. No. 436,129, filed Mar. 1, 1965, now Patent No. 3,282,501.

When flying it is the usual procedure to draw a line on a map to depict the intended flight or course of the plane. In order to make certain that the actual flight path of the plane responds to the projected flight path, check points are periodically noted on the map which occur along the projected flight path. Check points are normally prominent visible geographical objects, land marks or navigational aids that can be identified. The distance between check points can be scaled from the map, and the ground speed of the plane calculated fairly accurately taking into account the air speed of the plane and the prevailing wind. In order to positively assure the pilot that he is on course and on schedule, he will normally compute the elapsed time between check points and also the time of arrival at the next check point from a consideration of distance and velocity. This computation, while not extremely complex, can be very confusing when done under flight conditions, particularly for an inexperienced pilot. The computation must ordinarily be done fairly rapidly after each check point has been passed in order to calculate the estimated time of arrival at the next check point. If the task of flying the plane is demanding, or the flight path must be corrected due to drift and so forth, the activity could well cause an error which could be very serious.

Computers for calculating the factors involved in flying are known. However, the known computers are relatively complex to operate. In general, these known computers embody logarithmic scales which for the average person are difficult to read and to interpolate. To the inexperienced pilot the use of known types of computers to calculate routine calculations can be very confusing. If the computer must be used to correct or evaluate the ground velocity or the flight path, as is frequently the case, the known computing devices are particularly confusing and therefore generally unsatisfactory. In using the known computers the pilot must refer to a watch or clock which may be mounted in the airplane or otherwise in order to effectively make his computations. This also necessitates the pilot interpolating the time as recorded by the clock or watch to the elapsed times of his computations. In known computers it is also necessary to transcribe certain figures in order to arrive at the desired answer to the computations. All these extra operations can be dangerous if such use results in an incorrect calculation, lack of attention to the piloting of the airplane, and the result if the calculation relied on is incorrect.

I have invented an improved computer. The improved computer of my invention has a first element having indication means, first unit indicia, and a plurality of unit scale indicia thereon. A second element is secured to the first element for relative movement therebetween. A second unit indicia, corresponding to the first unit indicia is provided on the second element. A plurality of indicating indicia are correlated with the unit scale indicia. A movable pointer means is provided as a correlating means. A clock means is provided therewith which has a clock hand means provided as a further correlating means. The clock hand means preferably has an adjustable indicator therewith.

The new improved computer of my invention solves all of the problems common to computers known to the prior art. It is particularly adapted to be used in flying to calculate elapsed time, time of arrival, present position, velocity, etc., but can also be used to calculate other variables in other applications. All the indicia and scales on the computer of my invention are linear in nature, thereby making them easy to read and to interpolate. Further, my computer involves a very minimum number of elements, which makes the manipulation of same very simple and easy to master. The indicia depicting the variables is arranged in a logical manner making the use and manipulation of the computer of my invention practically fool proof. This is very important when the pilot is under stress or tension, because it operates to reduce the likelihood of errors.

The clock mechanism of my improved computer has thereon an adjustable indicator with symbolic aircraft which provides the pilot with an instantaneous reading of his present position along his course both in miles or distance in minutes or elapsed time. The adjustable indicator of my improved computer also provides the pilot with a continuous visual presentation of his progress along a course as well as providing information as to his relative position to known check points. All of this is done without calculations by the pilot. Only two fingers of one hand are needed to operate the computer. It is very easy and inexpensive to manufacture, which would place it within easy reach of many persons otherwise unable to afford conventional complicated calculating devices.

An object of this invention is to provide a newly improved computer means.

Another object of this invention is to provide a new improved computer particularly adapted to correlate time, speed and distance.

Still another object of this invention is to provide a new improved computer that is easy to read and to interpolate.

Yet another object of this invention is to provide a new computer in which the variables are logically arranged making manipulation and use of the computer relatively simple to the uninitiated person.

Still another object of this invention is a provide a new computer which can be used for a wide variety of applications by merely placing thereon indicia depicting the variables in the proper ranges.

And another object of this invention is to provide a new improved computer which has a clock mechanism and a clock hand which shows elapsed time on the face of the computer.

And yet another object of this invention is to provide a new computer that has a clock hand with a movable indicator thereon which correlates time, speed, and distance variables into a visible relative position.

Another object of this invention is to provide a new improved computer that is relatively inexpensive to manufacture.

Various other objects and advantages and features of the invention will become apparent to those skilled in the art from reading this disclosure.

Drawings accompany and are a part of this disclosure. These drawings depict preferred specific embodiments of the new improved computer of my invention and it is to be understood that these drawings are not to unduly limit the scope of the invention. In the drawings, FIG. 1 is a top plan view of a preferred specific embodiment of the improved computer of my invention particularly adapted to be mounted on the instrument panel, or other flat surface of an airplane, boat, vehicle, or the like.

FIG. 2 is a cross sectional view taken on line 2—2 of FIG. 1.

FIG. 3 is a cross sectional view taken on line 3—3 of FIG. 1.

FIG. 4 is a cross sectional view taken along line 4—4 of FIG. 1.

Figure 1:
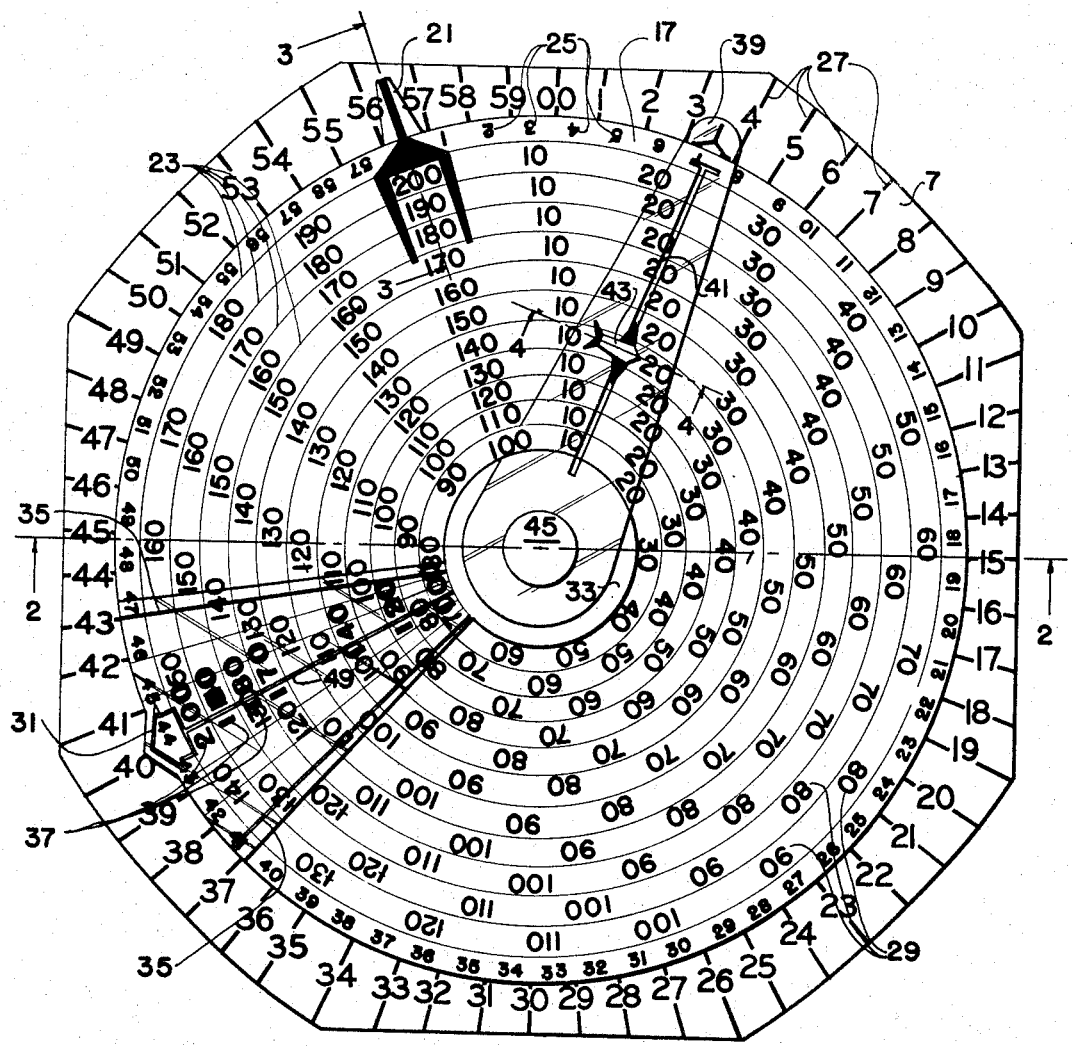

In the following is a discussion and description of the invention made with reference to the drawings whereon the same reference numerals are used to indicate the same or similar parts and/or structure. The discussion and description is of preferred specific embodiments of the new improved computer of my invention, and it is to be understood that the discussion and description is not to unduly limit the scope of the invention.

Referring now to the drawings in detail, an octagonal element 7 is depicted best at FIGS. 1 and 2. This element 7 can be disc-shaped, polygonal or the like but preferably octagonal. It is also preferably flat and is made of a comparatively rigid material such as metal or plastic, preferably of a laminated plastic material. Element 7 is adapted to be secured to a flat surface having a hole provided therein, by any suitable means such as by screws, rivets, adhesives, and the like but preferably by screw means (not shown).

Element 7 has a relatively small hole 9 through the center portion thereof. A clock mechanism 11 is rigidly mounted on the back portion of element 7. The clock mechanism 11 can be of any suitable type such as electric, spring actuated, or the like, but preferably an electrically actuated mechanism having a diameter less than the diameter of element 7. The clock mechanism 11 is secured to the backside of element 7 in any suitable manner such as screw means, rivets, adhesives, and the like but preferably by cementing bosses 13 to the backside of element 7. A clock shaft 15 which is operably connected to the clock mechanism 11 projects through the hole 9 in the element 7.

A disc 17 which has a diameter less than the diameter of the element 7, has a relatively small hole 19 in its center. This hole 19 is preferably only slightly larger than the diameter of the clock shaft 15. Disc 17 is mounted in overlying relationship on the front portion of element 7 with the clock shaft 15 projecting through the hole 19. A radially and upwardly extending projection 21 is provided on the periphery of the disc 17. The disc 17 has a plurality of evenly spaced concentric circles 23 described thereon. A first time scale 25 is disposed along the periphery of the disc 17 and is numbered with evenly spaced consecutive numerals from 1 to 60 beginning clockwise from the projection 21.

A second time scale 27 indicia is circularly disposed about the periphery of the element 7. The second time scale 27 corresponds in value and angular position to the first time scale 25 as best depicted on FIG. 1.

A plurality of distance scale indicia 29 are positioned between concentric circles 23 on the disc 17. These indicia 29 can be any suitable values, depending on the speed of the vehicle in which the computer is used, and the preferred distance between check points to be used in navigational calculations. Preferably the indicia 29 are indicated in ten mile values.

A generally wedge-shaped pointer is mounted in overlying relationship on the disc 17. This pointer 31 extends from the center of the disc 17 to the periphery thereof. The portion of the pointer 31 at the center of the disc 17 preferably has a small integral disc 33 which has a small hole in the center thereof through which the clock shaft 15 projects. The pointer 31 has two radial reference lines 35 described thereon. These reference lines 35 are preferably at an angle of 36 degrees relative to each other and the center of disc 17. A plurality of velocity indicating indicia 37 are positioned longitudinally along the pointer 31. These velocity indicating indicia 37 are positioned in alignment with the distance indicating scale indicia 29 on the disc 17. The pointer 31 can be made of suitable transparent material but preferably of a plastic material. The distance scale indicia 29 on disc 17 are arranged to correlate distance travel with velocity and time as indicated by the velocity indicating indicia 37 on the pointer 31, and the time scale indicia 25 on the periphery of the disc 17.

A clock hand 39 is mounted in overlying relationship to the pointer 31, and projects radially from the center of element 7 to slightly beyond the outer periphery of the disc 17. A small hole is provided in the inward portion of the clock hand through which the clock shaft 15 projects in close fitting frictional engagement, to turn therewith in operation, and also so that the hand can be turned relative to shaft 15 with finger pressure to set the hand. The clock hand 39 preferably has a longitudinal track 41. This track 41 extends radially of a length to cover the concentric circles 23 on the disc 17. An indicator 43 is adjustably mounted in the track 40 in relatively close fitting frictional engagement, so that it remains fixed in the desired position to which it is placed. The indicator 43 can be adjustable by any suitable means such as a track, gearing, cord and spool apparatus and the like. The clock hand 39 can be made of any suitable transparent material but preferably of a transparent plastic. The indicator 43 can be of any suitable material such as metal, wood, plastic or the like but preferably a plastic and should be of a size approximately the same width as the space between the concentric circles 23 on disc 17. The indicator should be contrasting to the transparent clock hand and the disc 17.

A securing knob 45 is mounted on the projecting end portion of the clock hand 15. This knob 45 can be mounted in any suitable manner but preferably by a set screw 47 which engages the clock shaft 15. The knob 45 is preferably mounted sufficiently loosely so as to allow rotation of disc 17, pointer 31, and clock hand 39.

In normal use in an airplane the elapsed time between check points is normally less than one hour. The indicia 25 is preferably in increments of one hour with each of the numbers depicting the minute of the hour. The velocity indicating indicia 37 on the pointer 31 can be of any suitable value according to the normal operating speeds of the vehicle in which it is used, and preferably indicated from 100 to 200 miles per hour in the preferred specific embodiment. The distance indicating indicia 29 are all based on the velocity indicating indicia 37 on the pointer 31. For an example, the innermost distance indicating scale indicates that 100 miles of distance is covered when a moving object or airplane travels at 100 miles per hour for intervals of 60 minutes.

The following is an example of a typical problem that can be simply solved with the computer of my invention as shown on FIG. 1. Supposing the last check point along a plotted course is passed over at 56½ minutes after the hour, the pointer 21 on disc 17 is set between 56 and 57 on indicia scale 27 of element 7, as shown on FIG. 1. Assuming the ground speed of the airplane is 140 miles per hour and the distance to the next check point is 102 miles, the pointer 31 is set so that the center line thereof 49 is over 102 underlying a velocity of 140 miles an hour as shown by indicia 37. The pointer 31 then indicates on the indicia 25 that the time elapsed to the next check point will be 44 minutes and will be slightly after 40 minutes after the hour. The clock hand 39 will always indicate the correct time in minutes after the hour so that a pilot in using the computer need only rotate the disc 17 so that the pointer 21 is in alignment with the track 41 of the clock hand when he reaches a check point. Thus the clock hand 39 will always show the true time as well as providing an easy reference to discover elapsed time on the indicia 25. The indicator 43 which is preferably in the shape of a small airplane in this embodiment is quite valuable in showing the distance the vehicle has traveled. The indicator is set at the velocity at which the airplane is flying, and the pilot can readily see the number of miles that he has traveled by merely reading indicia 29 which is beneath the indicator at any given time.

In the typical example FIGURE 1, the symbolic aircraft indicia 43 is positioned along the clockhand between the two concentric circles in a zone which is scaled to the velocity of 140 miles an hour. The indicia 43 is over a point on disc 17 which is approximately 17 miles distance from the last check point. By observing the position of the clock hand in reference to the first time scale 25 the pilot can also readily see that seven minutes have elapsed since passing the last check point. By further reference to the clock hand and second time scale 27 the pilot can see that it is three and one half minutes past the hour. By visually noting the relative position of the movable clock hand with miniature aircraft indicia 43 in relation to the stationary pointer 21 and the stationary centerline of pointer 49 and noting the constant clockwise angular changes of indicia 43 the pilot is continually given information which reveals his relative position along the course, distance traveled, total elapsed time on first scale 25 and present minute of the hour on second time scale 27.

It will be readily apparent to those skilled in the art that this computer can have many other applications, by substituting different unknown factors in the use thereof and merely following the general procedures as outlined hereinbefore. Any suitable values can be depicted by the indicia utilized on my computer to solve any suitable type of problem. My computer can be easily adapted to solve many problems where there are two or more variables related to time such as aircraft fuel consumption and endurance in minutes or hours at various pressure altitudes and temperatures in relation to aircraft weight, usable fuel, power settings and aerodynamic trim conditions. In addition, this computer is adaptable to time, speed, and distance problems of the various vehicles of land and water.

Reference lines 35 described on pointer 31 indicate to the pilot the area in which he must contain his estimated time of arrival for flight purposes. These lines mark the estimated time of arrival for the pilot within the three minutes either ahead or behind in which he is allowed to operate his airplane according to accepted flight plan practice. A pilot can quite easily, by the use of these lines, at a glance tell whether he is within the necessary estimated time of arrival, and if not he can correct his speed or alter his expected time of arrival by the use of the computer so that he arrives in proper time.

The foregoing discussion and description has been made in connection with preferred specific embodiments of the new improved computer of my invention. However, it is to be understood that the discussion and description is only intended to illustrate and teach those skilled in the art how to practice the invention, which is defined in the claims set forth hereinafter.

I claim:

1. A computer for correlating time of travel, time of arrival, distance and velocity, that is adapted to be mounted on a flat surface comprising, a flat octagonal element adapted to be secured to said flat surface, said element having a relatively small hole through the center thereof, a clock mechanism rigidly mounted on the back portion of said element having a clock shaft projecting through said hole, a disc having a relatively small hole in the center thereof and having a diameter less than the smallest diameter of said octagonal element, said disc movably mounted on the front portion of said octagonal element, said clock shaft projecting through said hole in said disc, a radially extending projection secured to said disc, for conjoint movement therewith, a plurality of evenly spaced concentric circle indicia on said disc, a first time scale being evenly spaced consecutive numeral indicia from zero to 60 beginning at said projection and progressing clockwise about the said periphery of said disc, a second time scale indicia circularly disposed around the periphery of said octagonal element, said second time scale indicia corresponding in value and angular position to said first time scale indicia, a plurality of distance scale indicia positioned concentrcally on said disc, each of said distance scales positioned between two concentric circle indicia and spaced about the circumference thereof, a generally wedge-shaped pointer rotatably and engagingly mounted on said disc, said pointer radially extending from the center of said disc to the periphery thereof, the portion of said pointer at the center of said disc having a relatively small integral disc, said integral disc having a small hole in the center thereof, said clock shaft projecting through said last-named hole, a plurality of velocity indicating indicia positioned longitudinally on said pointer, the spacing of said distance scale indicia arranged to correlate distance traveled with velocity and time as indicated by said velocity indicating indicia and said first time scale, a clock hand rotatably and engagingly mounted on said pointer and radially projecting outwardly to the periphery of said octagonal element from the center of said disc, the inner end portion of said clock hand having a relatively small hole, said clock shaft engagingly projecting through said last-named hole, said clock hand having a longitudinal slot of a length generally coincident with the radius of said first-named disc, an indicator slidably mounted in said slot, a securing knob rigidly mounted on the projecting end portion of said clock shaft and engaging a top portion of said clock hand, said computer constructed and adapted to indicate the correlation between time of arrival, time elapsed, distance, velocity, present position and relative position.

2. A computer for correlating time of travel, time of arrival, distance and velocity comprising, a flat base, a disc rotatably secured to said base in overlying relationship, a radially extending pointer projection integral with said disc for conjoint movement therewith, a plurality of evenly spaced concentric circle indicia on said disc, first time scale indicia disposed around the periphery of said disc, said first time scale indicia being evenly spaced consecutive numeral indicia from zero to 60 beginning at said pointer projection and progressing clockwise about the periphery of said disc, a second time scale indicia disposed on said base spaced outwardly from said disc and corresponding to said first scale indicia, a second pointer, means rotatably mounting said pointer on the center of said disc, a plurality of velocity indicating indicia longitudinally arranged on said second pointer, said velocity indicating indicia positioned on said pointer to assume positions between said concentric circle indicia on said disc, a plurality of distance scales on said disc, each of said distance scales positioned between two concentric circle indicia and spaced about the circumference, the spacing arranged to correlate distance traveled with velocity and time as indicated by said velocity indicating indicia and said first time scale, a clock mechanism secured to said base, a clock shaft and projecting through said base and said disc and said second pointer, a clock hand mounted on said clock shaft in overlying relationship to said second pointer, a longitudinally movable indicator on said clock hand, said computer adapted to indicate time of arrival and time elapsed for various distances for various velocities, present position and relative position.

3. A computer comprising, a first element, a clock mechanism mounted on said first element, a clock shaft projecting through the center of said first element, a disc rotatably mounted on said shaft and on said first element, said disc having an integral pointer extended radially therefrom, a first time scale indicia disposed about the periphery of said element, a second time scale indicia disposed along the periphery of said disc and corresponding to said first scale indicia, a second pointer rotatably mounted in the center of said disc on said shaft, a plurality of radially spaced velocity indicating indicia on said second pointer, a plurality of distance scales arranged concentrically on said disc aligned with said plurality of velocity indicating indicia, a radially extending clock hand mounted on said clock shaft for rotation therewith relative a stationary said first element and said disc, said clock hand having a longitudinally extending slot, an indicator slidably mounted in said slot, and said computer adapted to calculate time of arrival, time elapsed, distance, velocity, present position and relative position.

4. A computer comprising, a first element, a clock mechanism mounted on said first element, a disc rotatably mounted on said first element, said disc having an integral pointer extended radially therefrom, a first time scale indicia disposed about the periphery of said element, a second time scale indicia disposed along the periphery of said disc and corresponding to said first scale indicia, a second pointer rotatably mounted in the center of said disc, a plurality of radially spaced velocity indicating indicia on said second pointer, a plurality of distance scales arranged concentrically on said disc aligned with said plurality of velocity indicating indicia, said clock mechanism having a radially extending clock hand for rotation relative a stationary said first element and said disc, and said computer adapted to calculate time of arrival, time elapsed, distance, velocity, present position and relative position.

No references cited.

RICHARD B. WILKINSON, *Primary Examiner.*

S. A. WAL, *Assistant Examiner.*